United States Patent
Shih et al.

(10) Patent No.: US 9,374,697 B2
(45) Date of Patent: Jun. 21, 2016

(54) METHOD OF SELECTING AN ACTIVE SIM FOR AN EMERGENCY SERVICE AND MULTI-SIM DEVICE UTILIZING THE SAME

(71) Applicant: MediaTek Inc., Hsin-Chu (TW)

(72) Inventors: Wei-Feng Shih, Taichung (TW); Yuh-Hwang You, New Taipei (TW); Ming Lee, Taichung (TW); Chih-Hung Lee, Kaohsiung (TW)

(73) Assignee: MEDIATEK INC., Hsin-Chu (TW)

( * ) Notice: Subject to any disclaimer, the term of this patent is extended or adjusted under 35 U.S.C. 154(b) by 10 days.

(21) Appl. No.: 14/231,972

(22) Filed: Apr. 1, 2014

(65) Prior Publication Data
US 2015/0281929 A1     Oct. 1, 2015

(51) Int. Cl.
*H04W 4/22* (2009.01)
*H04W 48/18* (2009.01)
*H04W 88/06* (2009.01)
*H04W 76/00* (2009.01)

(52) U.S. Cl.
CPC .............. *H04W 4/22* (2013.01); *H04W 48/18* (2013.01); *H04W 76/007* (2013.01); *H04W 88/06* (2013.01)

(58) Field of Classification Search
CPC . H04W 76/007; H04W 8/26; H04M 2242/04; H04M 11/04; G08B 25/016; H04B 1/3816
USPC ........................................................ 455/404.1
See application file for complete search history.

(56) References Cited

U.S. PATENT DOCUMENTS

| | | | | |
|---|---|---|---|---|
| 2010/0279648 A1* | 11/2010 | Song | .................... | H04W 4/22 455/404.1 |
| 2011/0143703 A1* | 6/2011 | Seo | .................... | H04W 48/18 455/404.1 |
| 2013/0329639 A1* | 12/2013 | Wietfeldt | .............. | H04W 88/06 370/328 |
| 2014/0120859 A1* | 5/2014 | Ekici | .................... | H04W 4/22 455/404.1 |
| 2014/0140287 A1* | 5/2014 | Cheng | .................. | H04W 76/02 370/329 |
| 2015/0056943 A1* | 2/2015 | Huang | .................. | H04W 4/22 455/404.1 |

* cited by examiner

*Primary Examiner* — Sharad Rampuria
*Assistant Examiner* — Obidon Bassinan
(74) *Attorney, Agent, or Firm* — McClure, Qualey & Rodack, LLP (57) ABSTRACT

A method of selecting an active SIM for an emergency service and a multi-SIM device utilizing the same are disclosed. The method, adopted by the multi-SIM device, includes: receiving a request for an emergency call on a first SIM camping on an LTE network; determining whether a second SIM camps on a second communications network which supports an emergency service; and when the second communications network supports the emergency service, performing the emergency call from the second SIM.

12 Claims, 9 Drawing Sheets

METHOD OF SELECTING AN ACTIVE SIM FOR AN EMERGENCY SERVICE AND MULTI-SIM DEVICE UTILIZING THE SAME

BACKGROUND OF THE INVENTION

1. Field of the Invention

The present invention relates to telecommunication, and in particular relates to a method of selecting an active SIM for an emergency service and a wireless device utilizing the same.

2. Description of the Related Art

A multi-SIM (subscriber identity module) device, including particularly mobile phones, personal digital assistants, tablet and laptop computers, can hold two or more SIM cards. Each SIM card contains a unique international mobile subscriber identity (IMSI) and the related key which allow a mobile phone user to be identified and authenticated by a service provider. Hereinafter "SIM" and "SIM card" will be used interchangeably. The multi-SIM device allows a mobile phone user to operate with a corresponding number of communication networks and/or arrangements without the need to carry two or more devices, wherein the communication networks may be a Circuit Switched (CS) such as a second Generation (2G) telephony network or a Packet Switched (PS) networks such as an IP Multimedia Subsystem (IMS).

Emergency services include calls to any emergency services agencies, such as police, fire, or ambulance. The emergency calls may be a CS or an IMS call. If the emergency call is bound for a Public Switched Telephone Network (PSTN) number, the PSTN number will be translated into an address of nearest Public Safety Answering Point (PSAP) and the call will be delivered to the address. In IMS, once the call is recognized an emergency it will be routed appropriately without further user checks or authentication procedures.

Since the multi-SIM device contains multiple SIMs, a method of automatic SIM selection for performing emergency services and a multi-SIM device utilizing the same is required.

BRIEF SUMMARY OF THE INVENTION

A detailed description is given in the following embodiments with reference to the accompanying drawings.

A method adopted by a multi-SIM device supporting a plurality of SIMs is disclosed, comprising: receiving a request for an emergency call on a first SIM camping on an LTE network; determining whether a second SIM camps on a second communications network which supports an emergency service; and when the second communications network supports the emergency service, performing the emergency call from the second SIM.

Another embodiment of a multi-SIM device is provided, comprising first and second SIMs and a select circuit. The first SIM is configured to camp on an LTE network. The second SIM is configured to camp on a second communications network. The select circuit is configured to receive a request for an emergency call on a first SIM, determine whether the second SIM camps on the second communications network which supports an emergency service, and when the second communications network supports the emergency service, performing the emergency call from the second SIM.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Various aspects are described herein in connection with a wireless device, which can also be referred to as a system, device, subscriber unit, subscriber station, mobile station, mobile terminal, wireless terminal, mobile device, remote station, remote terminal, access terminal, user terminal, terminal, communication device, portable communication device, wireless communication device, user agent, user device, or user equipment (UE). The wireless terminal may be a cellular telephone, a satellite phone, a cordless telephone, a smartphone, a Session Initiation Protocol (SIP) phone, Personal Digital Assistant (PDA), a handheld device having wireless connection capability, a computing device, or other processing device connected to a wireless modem. Moreover, a base station described herein may be utilized for communicating with wireless terminal(s) and may also be referred to as an access point, a node B, or an evolved node B (eNB).

The techniques described herein may be used for various circuit switching (CS) and packet switching (PS) based communication systems such as Global System for Mobile Communications (GSM), General packet radio service (GPRS), Enhanced Data rates for GSM Evolution (EDGE), Universal Mobile Telecommunications System (UMTS), Code Division Multiple Access 2000 (CDMA2000), Enhanced Voice-Data Optimized (EVDO), High Speed Packet Access (HSPA), HSPA plus (GSPA+), Time Division-Synchronous Code Division Multiple Access (TD-SCDMA), Worldwide Interoperability for Microwave Access (WiMAX), Long Term Evolution (LTE), and LTE-Advanced (LTE-A) systems.

A subscriber identity module (SIM) card referred herein may be a universal SIM (USIM) card for Wideband Code Division Multiple Access (W-CDMA) or Time Division-Synchronous Code Division Multiple Access (TD-SCDMA) system, a removable User Identity Module (R-UIM) or a Code Division Multiple Access (CDMA) Subscriber Identity Module (CSIM) card for a CDMA2000 system. The SIM card contains an international mobile subscriber identity (IMSI) and a related key used to identify and authenticate subscribers on a mobile station (MS). The mobile station is immediately programmed after the SIM card(s) are plugged therein. The SIM cards may also be programmed to display custom menus for personalized services.

The embodiments described herein utilize a Dual-SIM configuration of a wireless device, which allows the use of two data services on one device. The scope of the invention, however, is not limited to a Dual-SIM device, and can be extended to a multi-SIM device, based on the principles outlined in the disclosure.

Figure 1:
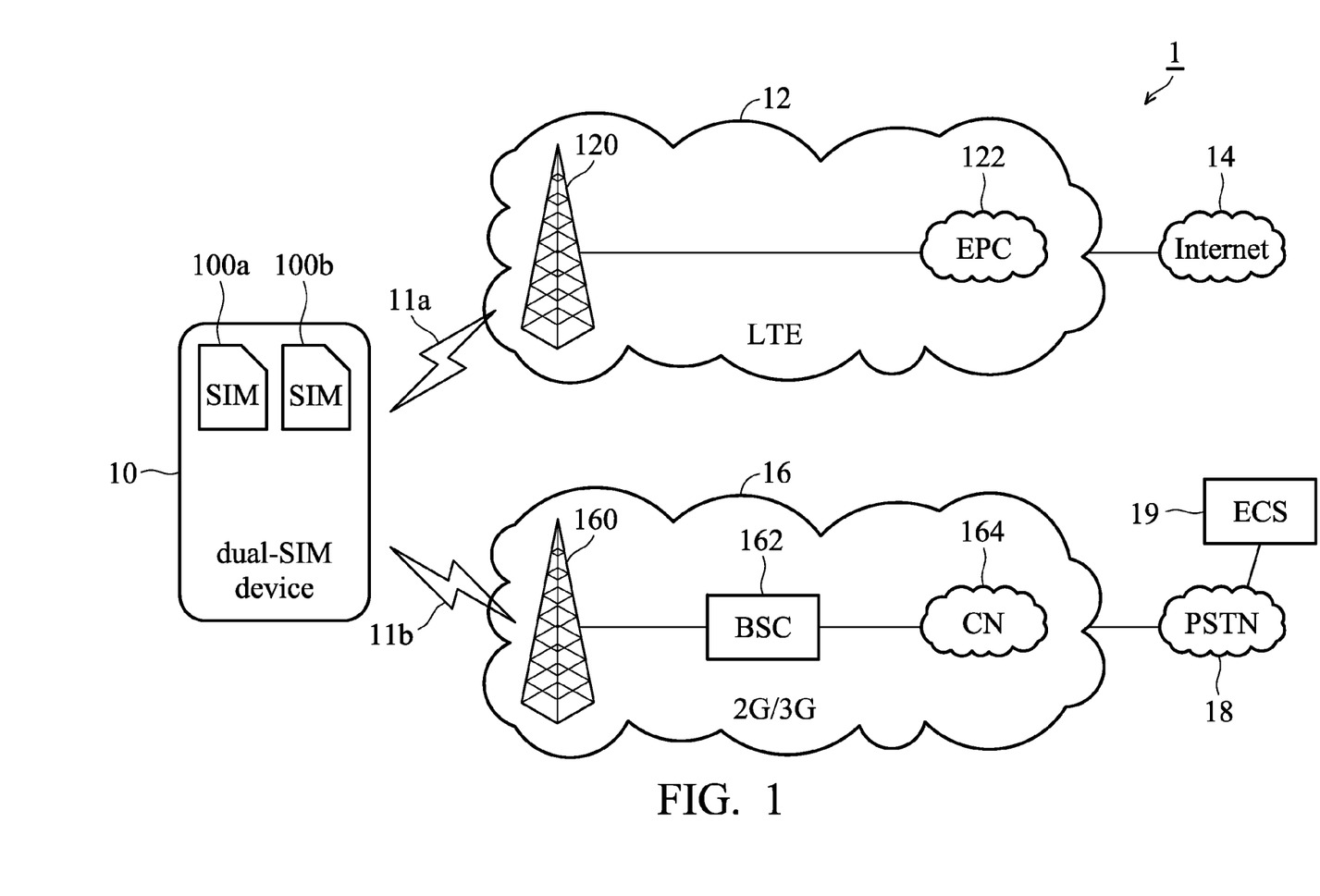
FIG. 1 illustrates a schematic diagram of a mobile communication system 1.

FIG. 1 illustrates a schematic diagram of a mobile communications system 1, incorporating a dual-SIM device 10 which carries two subscriber identity module (SIM) cards 100a and 100b simultaneously to access the same or different communication networks after camping on cells. The mobile communications system 1 contains an LTE network 12 which connects to Internet 14 and a GSM network 16 which connects to a public switched telephone network (PSTN) 18. The PSTN 18 is further connected to an emergency call server (ECS) 19. The LTE network 12 includes a base station 120 and an Evolved Packet Core (EPC) 122. The GSM network 16 includes a base station 160, a base station controller 162 and a core network 164. The ECS 19 can process, direct and inform the emergency call to persons responsible.

The two SIM cards 100a and 100b which are employed by the dual-SIM device 10 may be a SIM, USIM, R-UIM, CSIM, or other types of SIM card subscribed to mobile communications networks. In the embodiment, the SIM 100a subscribes to the LTE network 12 and the SIM 100b subscribes to the GSM system 16.

An emergency service is not a subscription service and therefore can be supported automatically without normal registration and authentication. An emergency call can be routed in a CS or a PS network. By selecting the SIM card 100a or 100b to launch an emergency call, the roaming dual-SIM device 10 can initiate an emergency registration with the LTE network 12 or the GSM system 16. Emergency call routing must comply with regulations applicable to where the caller is currently physically located.

In roaming, the dual-SIM device 10 can obtain the emergency service through the GSM network 16 by dialing an emergency number to route the call to the emergency agencies where the dual-SIM device 10 is located.

In order to acquire the emergency service from the LTE network 12, the LTE network 12 must connect to an IP Multimedia Subsystem (IMS) or have Voice over LTE (VoLTE) feature implemented, where IMS is a PS-based framework for delivering IP multimedia services, and VoLTE delivers the voice service as data flows within the LTE data bearer. If IMS and VoLTE supports are not available either in the dual-SIM device 10 in the camped LTE network 12, then the dual-SIM device 10 camping on the LTE cell can request a CS fallback or reselect a 2G or 3G network for an emergency call, where a voice service is obtained by falling back to the circuit switched domain. To prepare for a possible CS fallback, the dual-SIM device 10 must perform a combined attach to the PS and the CS domain. If the need for a CS fallback arises later on, then the dual-SIM device 10 will send a service request to a Mobility Management Entity (MME) server (not shown) in the EPC 122. The MME server will inform the dual-SIM device 10 to be handed over to a second or third generation (2G/3G) cell. Handover procedures involve numerous steps such as a frequency scan, cell synchronization, and system information acquisition, and typically takes 1 to 2 seconds at least, and 5 to 6 seconds at most to be completed. After the handover procedures, the dual-SIM device 10 can initiate a Mobility Management (MM) connection to the handed over cell for the CS emergency call. After the emergency call is completed, depending on implementation, the dual-SIM device 10 may have to be handed back to the previous LTE cell prior to the emergency call, which requires additional time and system resources for processing.

The dual-SIM device 10 may be a Dual-SIM Dual Standby (DSDS), which allows two SIMs to be on standby waiting for a call, or a Dual-SIM Full Active (DSFA) device, which allows two SIMs to be able to establish calls concurrently. In either case, the dual-SIM device 10 can select a SIM which has a radio coverage on an LTE network with the IMS or VoLTE support, or a 2G or 3G network which does not require a CS fallback to establish the emergency session. In the case depicted in FIG. 1, when a user makes an emergency call on the SIM 100a, which camps on the LTE network 12 without the IMS and VoLTE supports, the dual-SIM device 10 can automatically select and switch to the SIM 100b, which camps on the GSM network 16, to initiate the emergency session, thereby avoiding the CS fallback or 2G/3G network reselection and reducing the resource requirements for switching between networks for the emergency call.

The wireless device 10 employs a select module to select a SIM to initiate an emergency session. Please refer to FIG. 2 for a block diagram of an exemplary dual-SIM device 10 employing the Dual-SIM Dual Standby feature, automatically selecting a SIM card for emergency services according to an embodiment of the invention. The dual-SIM device 10 contains hardware circuit components and firmware/software codes to provide the automatic SIM selection for the emergency services, including two SIM cards 100a and 100b, a baseband processor 22, an RF circuit 24, an antenna 26 and a memory device 20 which contains codes and instructions of a select module 200, an application module 202, and modem modules 204 and 206.

Figure 2:
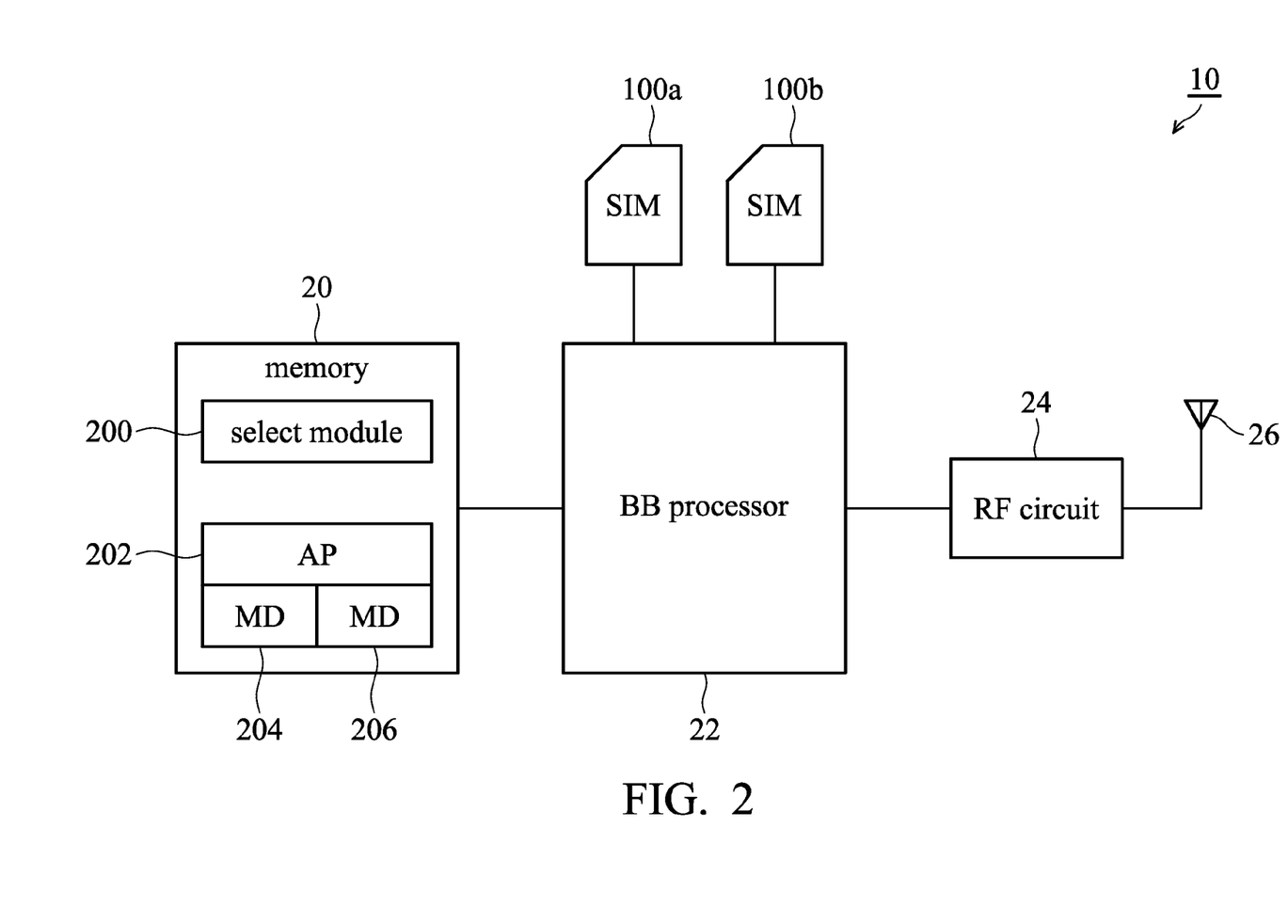
FIG. 2 is a block diagram of a dual-SIM device 10 according to an embodiment of the invention.

The SIMs 100a and 100b, the RF circuit 24 and the memory device 20 are connected to the baseband processor 22. The RF circuit 24 is configured to provide signal processing of the RF signals received and sent over the SIM connections corresponding to the SIMs 100a and 100b via the antenna 26. When executed, the select module 200, the application module 202, and the modem modules 204 and 206, will cause the baseband processor 22 to execute the codes and instructions therein, and perform steps and functions of selecting an active SIM for launching the emergency service, and specific functions concerning with modem operations, respectively.

Specifically, the modem module 204 is configured to process the data for a SIM connection established on the SIM 100a, whereas the modem module 206 is configured to process the data for a SIM connection established on SIM 100b. The modem modules 204 and 206 may be implemented as firmware or software, performing various modem operations and functions for data connections on the SIM 100a and 100b. The select module 200, implemented by firmware or software, communicates and interacts with the modem modules 204 and 206 and carries out the automatic SIM selection procedure for the emergency service according to the embodiment of the invention. The application module 202, implemented by software, communicates and interacts with the select module 200 and performs application programs such as a user interface which allows the user to enter a SIM card preference for data or voice services.

Although the Dual-SIM Dual Standby structure is adopted by the embodiment in FIG. 2, people skilled in the art would recognize that the Dual-SIM Full Active (DSFA) structure can also be adopted by the dual-SIM device 10 in FIG. 1, with two sets of RF circuits and antennas. In DSFA implementation, each set of RF circuit and antenna is dedicated to a SIM card. For example, the dual-SIM device 10 can establish connections to the LTE network 12 and the GSM network 16 concurrently, with the GSM connection serves for the emergency services and the LTE connection serves for normal data services.

Figure 3:
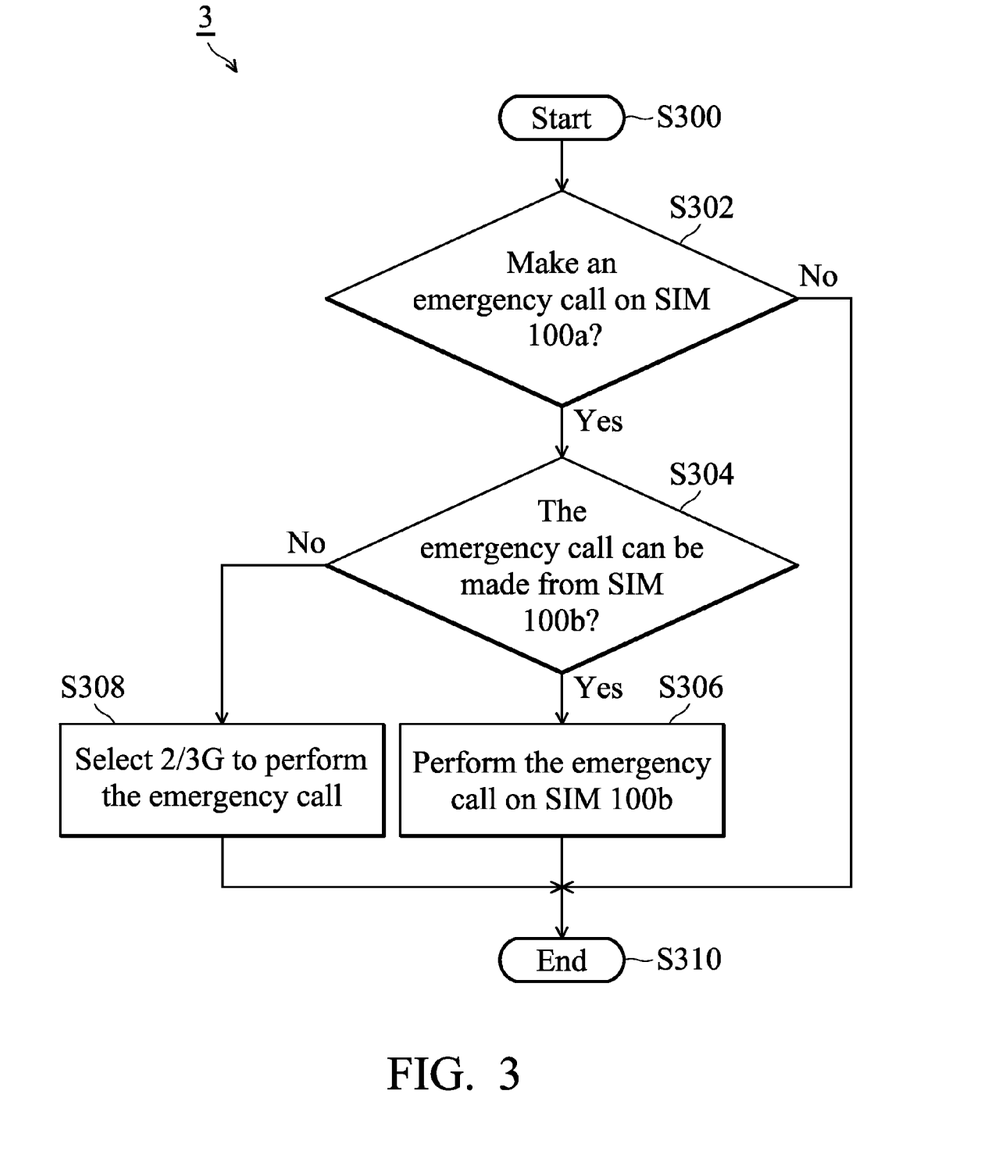
FIG. 3 is a flowchart of a selection method 3, selecting an active SIM to perform an emergency service according to an embodiment of the invention.

The select module 200 contains codes and instructions which performs a selection method 3 in FIG. 3, which selects an active SIM to perform an emergency service according to an embodiment of the invention. The selection method 3 is initiated upon a request for an emergency service is received by the dual-SIM device 10. The selection method 3 will not be used in a normal data or voice service.

Upon startup, the dual-SIM device 10 has connected to the LTE network 12 on the SIM 100a, and connected to the GSM network 16 on the SIM 100b (S300). The LTE network 12 does not support IMS and VoLTE features, thus the dual-SIM device 10 cannot acquire emergency service from the LTE network 12. The GSM network 16 is connected to the ECS 19 through the PSTN 18 to provide the emergency services. The dual-SIM device 10 may have the SIM 100a set as a default or user preferred SIM for obtaining services.

The select module 200 is configured to determine whether an emergency call request is received on the SIM 100a of the dual-SIM device 10 (S302). When a user makes an emergency call while the dual-SIM device 10 is using the SIM 100a for acquiring other services, the SIM 100a will receive a request for an emergency service on the SIM 100a. When the select module 200 identifies the presence of the emergency call request, the selection method 3 goes to Step S304, when the select module 200 determines that no emergency call is requested, the selection method 3 goes to Step S310 to exit.

The select module 200 may further determine a network status of the connection associated with the SIM 100a. The network status includes radio coverage and IMS and VoLTE supportability of the LTE network 12. For example, the LTE network 12 may have normal service coverage, limited service coverage, or no service coverage. In some embodiments, the network status of the connection associated with the SIM 100a indicates the LTE network 12 has a normal or limited service coverage and IMS or VoLTE supportability. Therefore, the select module 200 can launch the emergency call request on the SIM 100a. In other embodiments, the network status of the connection associated with the SIM 100a indicates the LTE network 12 has normal or limited service coverage and no IMS and VoLTE supports. Consequently, the select module 200 cannot launch the emergency request from the SIM 100a, and the selection method 3 has to go to Step S304 for determining the next operation. In other embodiments, the network status of the connection associated with the SIM 100a indicates the LTE network 12 has no coverage. As a consequence, the select module 200 cannot launch the emergency request from the SIM 100a, and the selection method 3 has to go to Step S304 for determining the next operation.

In Step S304, the select module 200 is configured to determine whether the other SIM 100b camps on a communications network which supports the emergency service (S304), i.e., whether the communications network is a 2G, 3G, or LTE network with IMS or VoLTE supportability. If so, the select module 200 can automatically switch to the SIM 100b for making the emergency call (S306). Otherwise, the selection method 3 has to reselect a 2G/3G cell or an LTE cell which supports IMS and VoLTE for the SIM 100a to camp on and provide the emergency service (S308). For example, the GSM network 16 is a 2G network which supports the emergency services. As a result, the select module 200 may switch to the SIM 100b for the emergency service.

In Step S306, the select module 200 is configured to select the SIM 100b for acquiring the emergency service. The dual-SIM device 10 then performs the emergency call from the SIM 100b. After the emergency call, the select module 200 may switch back to the SIM 100a for acquiring non-emergency services. The selection method 3 is then completed and exited (S310).

In Step S308, since both the connections associated with the SIMs 100a and 100b do not support the emergency service, the select module 200 is configured to perform a CS fallback, or reselect a 2G, 3G, or LTE cell with the IMS or VoLTE support for the SIM 100a to camp on and provide the emergency service. After the emergency call, the select module 200 may instruct the SIM 100a to connect back to the LTE cell before the emergency request. The selection method 3 is then completed and exited (S310).

The selection method 3 is adopted by the select module 200 to select a SIM to provide the emergency service, avoiding the CS fallback or 2G/3G network reselection where possible and reducing the resource requirements for switching between networks for the emergency call.

FIGS. 4A, 4B, 4C, and 4D show embodiments of various SIM combinations for the SIM 100a and 100b, from which the dual-SIM device 10 can select an active SIM to perform an emergency service according to an embodiment of the invention. The SIM 100a in FIGS. 4A through 4D has normal coverage. The dual-SIM devices 10 in FIGS. 4A through 4D can employ the selection method 3 in FIG. 3 to select a SIM for providing the emergency service.

Figure 4A:
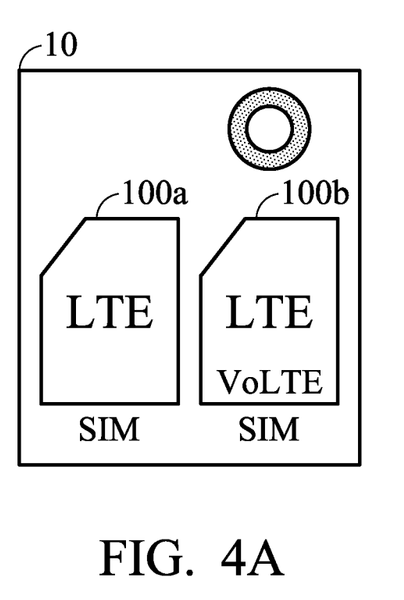
FIGS. 4A, 4B, 4C, and 4D show embodiments of various SIM combinations, from which the dual-SIM device 10 can select an active SIM to perform an emergency service according to an embodiment of the invention.

Referring to FIG. 4A, which illustrates that the SIM 100a camps on an LTE network and the SIM 100b camps on another LTE network with VoLTE support. When an emergency service is requested on the SIM 100a, the select module 200 of the dual-SIM devices 10 can select the SIM 100b for the emergency service.

Figure 4B:
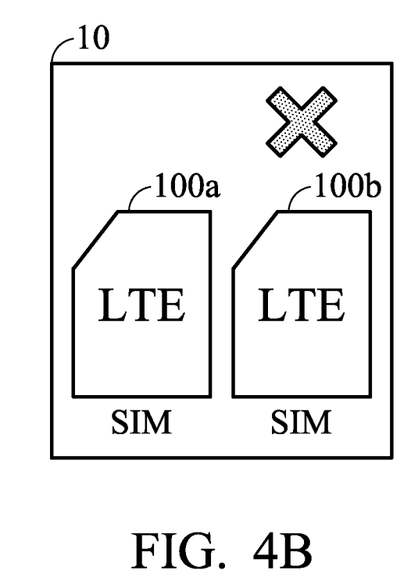

FIG. 4B illustrates the SIM 100a camps on an LTE network and the SIM 100b camps on another LTE network, both LTE networks lacks IMS or VoLTE support. When an emergency service is requested on the SIM 100a, the select module 200 cannot select the SIM 100a or SIM 100b for the emergency service. One of the SIM 100a and 100b has to perform the CS fallback or 2G/3G reselection to provide the emergency service.

Figure 4C:
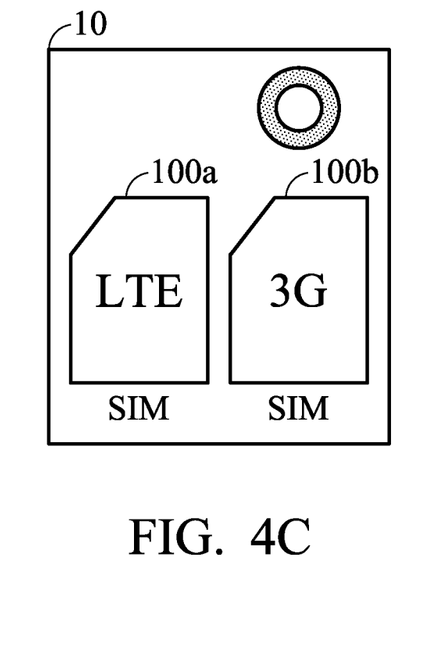

FIG. 4C illustrates the SIM 100a camps on an LTE network and the SIM 100b camps on a 3G network. When an emergency service is requested on the SIM 100a, the select module 200 can select the SIM 100b for the emergency service.

Figure 4D:
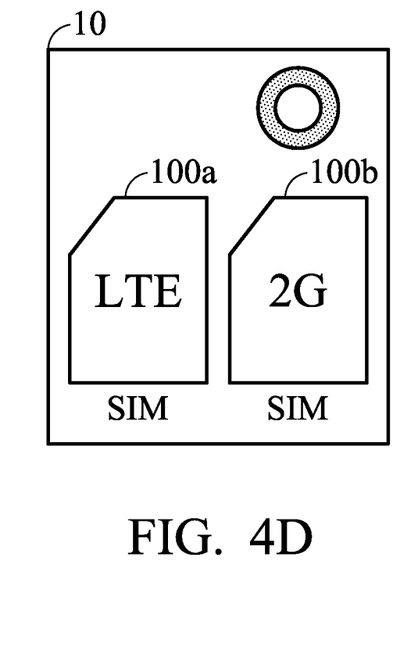

FIG. 4D illustrates the SIM 100a camps on an LTE network and the SIM 100b camps on a 2G network. When an emergency service is requested on the SIM 100a, the select module 200 can select the SIM 100b for the emergency service.

FIGS. 5A, 5B, 5C, and 5D show other embodiments of various SIM combinations for the SIM 100a and 100b, from which the dual-SIM device 10 can select an active SIM to perform an emergency service according to an embodiment of the invention. The SIM 100a in FIGS. 5A through 5D has limited service coverage. The dual-SIM devices 10 in FIGS. 5A through 5D can employ the selection method 3 in FIG. 3 to select a SIM for providing the emergency service.

Figure 5A:
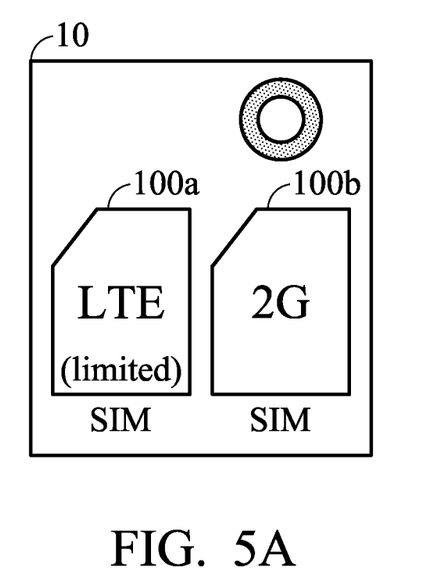
FIGS. 5A, 5B, 5C, and 5D show other embodiments of various SIM combinations, from which the dual-SIM device 10 can select an active SIM to perform an emergency service according to an embodiment of the invention.

FIG. 5A illustrates the SIM 100a camps on an LTE network with limited service coverage and the SIM 100b camps on a 2G network. When an emergency service is requested on the SIM 100a, the select module 200 can select the SIM 100b for the emergency service.

Figure 5B:
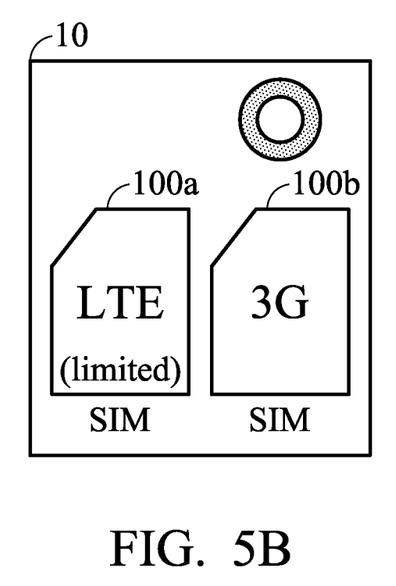

FIG. 5B illustrates the SIM 100a camps on an LTE network with limited service coverage and the SIM 100b camps on a 3G network. When an emergency service is requested on the SIM 100a, the select module 200 can select the SIM 100b for the emergency service.

Figure 5C:
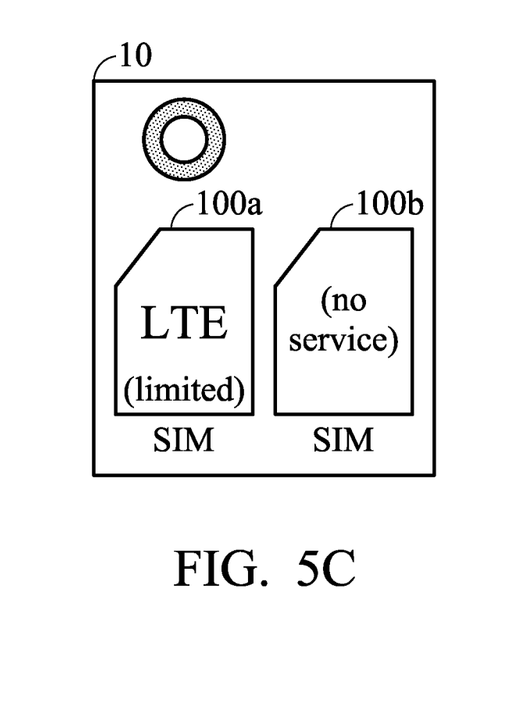

FIG. 5C illustrates the SIM 100a camps on an LTE network with limited service coverage and the SIM 100b has no network coverage. When an emergency service is requested on the SIM 100a, the select module 200 cannot select the SIM 100a or SIM 100b for the emergency service. One of the SIM 100a and 100b has to perform the CS fallback or 2G/3G reselection to provide the emergency service.

Figure 5D:
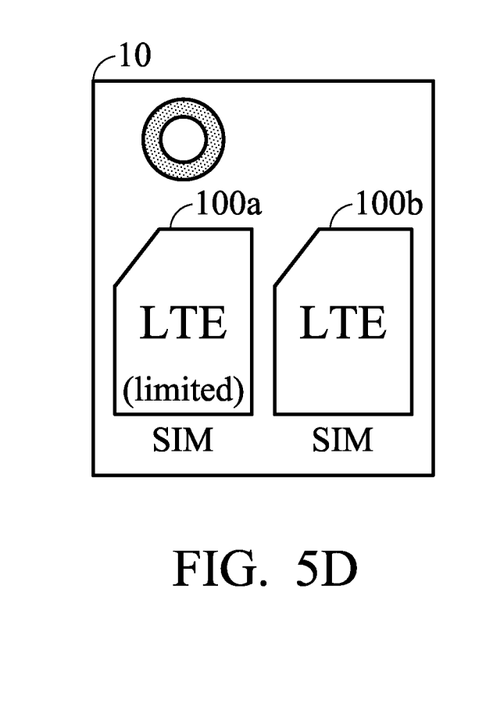

FIG. 5D illustrates the SIM 100a camps on an LTE network with limited service coverage and the SIM 100b camps on another LTE network with normal service coverage, both LTE networks lacks IMS or VoLTE support. When an emergency service is requested on the SIM 100a, the select module 200 cannot select the SIM 100a or SIM 100b for the emergency service. One of the SIM 100a and 100b has to perform the CS fallback or 2G/3G reselection to provide the emergency service.

Figure 6A:
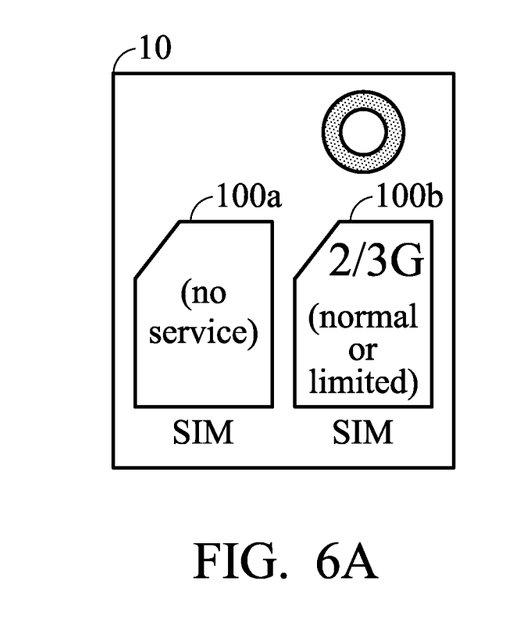
FIGS. 6A and 6B show other embodiments of various SIM combinations, from which the dual-SIM device 10 can select an active SIM to perform an emergency service according to an embodiment of the invention.
Figure 6B:
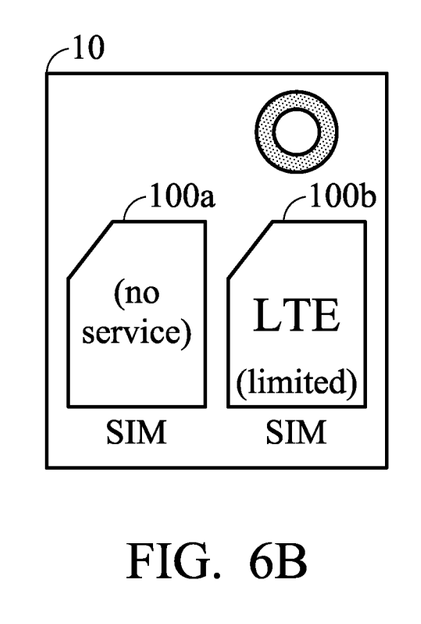

FIGS. 6A and 6B show other embodiments of various SIM combinations for the SIM 100a and 100b, from which the dual-SIM device 10 can select an active SIM to perform an emergency service according to an embodiment of the invention. The SIM 100a in FIGS. 6A and 6B has no network coverage. The dual-SIM devices 10 in 6A and 6B can employ the selection method 3 in FIG. 3 to select a SIM for providing the emergency service.

FIG. 6A illustrates the SIM 100a has no network coverage and the SIM 100b camps on a 2G or 3G network with limited or normal service coverage. When an emergency service is requested on the SIM 100a, the select module 200 can select the SIM 100b for the emergency service.

FIG. 6B illustrates the SIM 100a has no network coverage and the SIM 100b camps on an LTE network with limited or normal service coverage, and without IMS and VoLTE supports. When an emergency service is requested on the SIM 100a, the select module 200 can select the SIM 100b for the emergency service. 100b has to perform the CS fallback or 2G/3G reselection to provide the emergency service.

Figure 7:
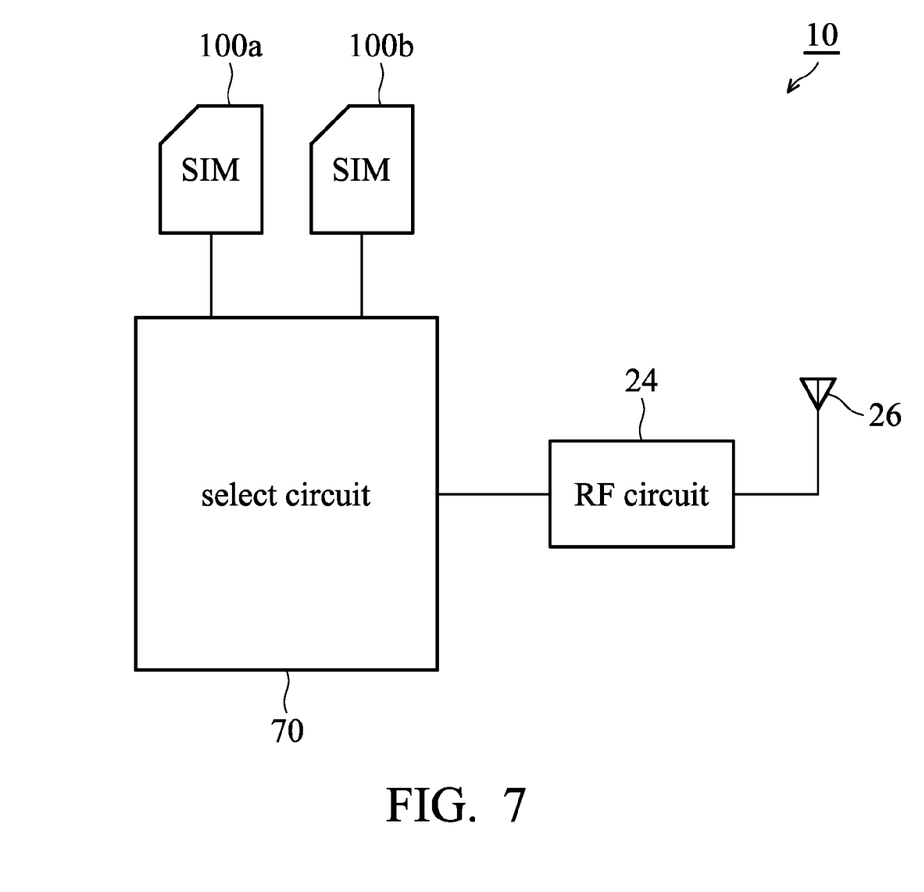
FIG. 7 is a block diagram of another dual-SIM device 10 according to an embodiment of the invention.

FIG. 7 is a block diagram of another dual-SIM device 10 according to an embodiment of the invention. The dual-SIM device 10 includes two SIM cards 100a and 100b, a select circuit 70, an RF circuit 24, and an antenna 26.

The SIM 100a subscribes to a LTE network without IMS and VoLTE supports and the SIM 100b subscribes to a second communication network. The second communication network may be a 2G, 3G, 4G, or a future generation of communication networks. The dual-SIM device 10 perform services on the SIM 100a or 100b to communicate with the external communications networks through the RF circuit 24 and the antenna 26.

The select circuit 70 is configured to automatically select a SIM for providing the emergency service according to the selection method 3 in FIG. 3. The select circuit 70, coupled to the SIMs 100a and 100b, when receiving a request for an emergency call on the SIM 100a, is configured to determine whether the SIM 100b camps on a communications network which supports the emergency service. A 2G, 3G or LTE network with IMS or VoLTE support is regarded as being capable of supporting the emergency service. If the SIM 100b connects to a GSM network which is a 2G network, the select circuit 70 is configured to perform the emergency call from the SIM 100b.

In some embodiments, the select circuit 70 is further configured to determine whether the SIM 100a camps on the LTE network which supports the emergency service. That is, whether the LTE network supports IMS or VoLTE features. When the LTE network does support IMS or VoLTE, the select circuit 70 is configured to select the SIM 100a for the emergency service. When the LTE network does not support IMS or VoLTE, the select circuit 70 is then configured to determine whether the SIM 100b camps on the second communications network which supports the emergency service. If the SIM 100b connects to a GSM network which is a 2G network and supports the emergency service, the select circuit 70 is configured to perform the emergency call from the SIM 100b.

In some embodiments, the select circuit 70 is configured to determine whether the SIM 100a camps on the LTE network with coverage. When the LTE network has no coverage, the select circuit 70 is configured to determine whether the SIM 100b camps on the second communications network has the emergency service supportability. For example, if the second communications network is a GSM network then it has emergency service supportability.

In some embodiments, when neither of the LTE network nor the second communications network supports the emergency service, the select circuit 70 is configured to perform the CS Fallback (CSFB) or the 2G/3G cell reselection on one of the SIMs 100a and 100b.

The dual-SIM device 10 in FIG. 7 adopts the select circuit 70 to select a SIM to provide the emergency service, avoiding the CS fallback or 2G/3G network reselection where possible and reducing the resource requirements for switching between networks for the emergency call.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The term "or" used herein is intended to mean an inclusive "or" rather than an exclusive "or." That is, unless specified otherwise, or clear from the context, the phrase "X employs A or B" is intended to mean any of the natural inclusive permutations. In addition, the articles "a" and "an" as used in this application and the appended claims should generally be construed to mean "one or more" unless specified otherwise or clear from the context to be directed to a singular form.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

The operations and functions of the various logical blocks, modules, and circuits described herein may be implemented in circuit hardware or embedded software codes that can be accessed and executed by a processor.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method, adopted by a multi-SIM device supporting a plurality of SIMs, the method comprising:
    receiving a request for an emergency call on a first SIM camping on an LTE network;
    determining whether the LTE network supports an emergency service;
    determining whether a second communications network which a second SIM camps on supports the emergency service when the LTE network does not support the emergency service; and
    when the second communications network supports the emergency service, performing the emergency call from the second SIM.

2. The method of claim 1, wherein the step of determining whether the LTE network supports the emergency service comprises:
    determining whether the LTE network supports Voice over LTE (VoLTE) or IP Multimedia Subsystem (IMS).

3. The method of claim 1, further comprising:
    determining whether the LTE network has coverage; and
    when the LTE network does not support the emergency service and/or the LTE network has no coverage, determining whether the second communications network supports the emergency service.

4. The method of claim 1, further comprising:
    when neither of the LTE network nor the second communications network supports the emergency service, performing a Circuit-Switched Fallback (CSFB) on the first SIM.

5. The method of claim 1, further comprising:
    when neither of the LTE network nor the second communications network support the emergency service, selecting a Second Generation (2G) network or a Third Generation (3G) network for the first SIM to camp on.

6. The method of claim 1, wherein the second communications network is a 2G network, a 3G network, or another LTE network which supports VoLTE or IMS.

7. A multi-SIM device, comprising:
    a first SIM, configured to camp on an LTE network;
    a second SIM, configured to camp on a second communications network; and
    a select circuit, coupled to the first and second SIMs, configured to receive a request for an emergency call on a first SIM, determine whether the LTE network supports an emergency service, determine whether the second communications network supports the emergency service when the LTE network does not support the emergency service, and when the second communications network supports the emergency service, performing the emergency call from the second SIM.

8. The multi-SIM device of claim 7, wherein the select circuit is configured to determine whether the LTE network supports Voice over LTE (VoLTE) or IP Multimedia Subsystem (IMS).

9. The multi-SIM device of claim 7, wherein the select circuit is configured to determine whether the LTE network has coverage, and when the LTE network does not support the emergency service and/or the LTE network has no coverage, determine whether the second communications network supports the emergency service.

10. The multi-SIM device of claim 7, when neither of the LTE network nor the second communications network support the emergency service, the select circuit is configured to perform a Circuit-Switched Fallback (CSFB) on the first SIM.

11. The multi-SIM device of claim 7, when neither of the LTE network nor the second communications network support the emergency service, the select circuit is configured to select a Second Generation (2G) network or a Third Generation (3G) network for the first SIM to camp on.

12. The multi-SIM device of claim 7, wherein the second communications network is a 2G network, a 3G network, or another LTE network which supports VoLTE or IMS.

* * * * *